United States Patent
Howarth

(10) Patent No.: US 10,376,797 B2
(45) Date of Patent: Aug. 13, 2019

(54) PLATFORM FOR GESTURAL GAMING DEVICE

(71) Applicant: Andrew Howarth, San Francisco, CA (US)

(72) Inventor: Andrew Howarth, San Francisco, CA (US)

(*) Notice: Subject to any disclaimer, the term of this patent is extended or adjusted under 35 U.S.C. 154(b) by 0 days.

(21) Appl. No.: 15/592,139

(22) Filed: May 10, 2017

(65) Prior Publication Data

US 2017/0326463 A1    Nov. 16, 2017

Related U.S. Application Data

(60) Provisional application No. 62/335,632, filed on May 12, 2016.

(51) Int. Cl.

| | |
|---|---|
| A63F 9/00 | (2006.01) |
| A63F 13/95 | (2014.01) |
| A63F 13/92 | (2014.01) |
| A63F 13/211 | (2014.01) |
| G07F 17/32 | (2006.01) |
| A63F 13/285 | (2014.01) |
| A63F 13/79 | (2014.01) |
| A63F 13/46 | (2014.01) |
| A63F 13/352 | (2014.01) |
| A44C 25/00 | (2006.01) |
| A44C 1/00 | (2006.01) |
| A44C 5/00 | (2006.01) |
| A44C 15/00 | (2006.01) |

(Continued)

(52) U.S. Cl.
CPC ............ *A63F 13/95* (2014.09); *A44C 1/00* (2013.01); *A44C 5/0007* (2013.01); *A44C 15/0015* (2013.01); *A44C 25/001* (2013.01); *A63F 13/211* (2014.09); *A63F 13/26* (2014.09); *A63F 13/285* (2014.09); *A63F 13/327* (2014.09); *A63F 13/352* (2014.09); *A63F 13/46* (2014.09); *A63F 13/79* (2014.09); *A63F 13/92* (2014.09); *G06Q 30/0241* (2013.01); *G06Q 30/0605* (2013.01); *G07F 17/3255* (2013.01)

(58) Field of Classification Search
None
See application file for complete search history.

(56) References Cited

U.S. PATENT DOCUMENTS

| | | | |
|---|---|---|---|
| 9,888,090 B2 * | 2/2018 | Poisner | H04L 67/306 |
| 2011/0244961 A1 * | 10/2011 | Soelberg | G06F 3/017 |
| | | | 463/32 |

(Continued)

*Primary Examiner* — Seng Heng Lim
(74) *Attorney, Agent, or Firm* — Dergosits & Noah LLP

(57) ABSTRACT

Systems and methods are described for playing a game using a gestural gaming device. In an embodiment, the gestural gaming device includes a processor, a sensor, a communications transceiver, and a plurality of lighting elements. An application may be executed on a mobile device in communication with the gestural gaming device via the communications transceiver. The system may also include a back-end server in communication with the application over a network. The game may be played using the gestural gaming device in conjunction with one or more gestures, the game being managed by the application using the plurality of lighting elements. A winner of the game may be awarded a reward in response to winning the game from the back-end server via the gestural gaming device.

2 Claims, 19 Drawing Sheets

(51) Int. Cl.
*G06Q 30/02* (2012.01)
*G06Q 30/06* (2012.01)
*A63F 13/26* (2014.01)
*A63F 13/327* (2014.01)

(56) References Cited

U.S. PATENT DOCUMENTS

2017/0080332 A1* 3/2017 Poisner .................. G06F 3/017
2017/0087453 A1* 3/2017 Poisner ................. A63F 13/211
2017/0093848 A1* 3/2017 Poisner ............... H04L 63/0861

* cited by examiner

100

560

PLATFORM FOR GESTURAL GAMING DEVICE

CROSS-REFERENCE TO RELATED APPLICATIONS

The present application claims the benefit of the U.S. Provisional Application No. 62/335,632 entitled "Platform for Gestural Gaming Device," filed on May 12, 2016, the entire contents of which are incorporated herein.

FIELD OF THE INVENTION

The present disclosure generally relates to electronic game devices that operate together with a reward infrastructure, and more particularly a gestural game device that works in conjunction with a rewards server to store, claim, and transact rewards based on game play using the gestural game device.

SUMMARY OF THE INVENTION

Fantasta, described below, is a social game in which small groups of 3-9 players sit face to face, and tap, bump, wave, wiggle or shake a small gestural game device, to play any one of a variety of bar games, dating games, sports games, rhythm games, and puzzle games.

In advance of any Fantasta game, each player may digitally stash a written or verbal promise inside their gestural game device. During some games, the digital contents of a player's gestural game device is unknown to the other players. After the game, only the winner may claim one of the digitally stored promises from one of the losers. That promise may be literally and ceremonially transferred from the loser's gestural game device to the winner's gestural game device. It is only when the game is over that players may learn the true digital contents of any players' game device.

In addition to promises, a variety of digitally stored social obligations can be won or lost during game play, including but not limited to dares, secrets, wishes, social plans, dates, etc. Because these social obligations, or commitments, or vows, or player pacts, are not known until the end of game play, they are collectively called "surprizes." The act of giving and receiving a "surprize" indicates the loser and winner agree to fulfill this promise at a later time.

Winning or losing promises, dares, secrets, dates, etc., is just one aspect of Fantasta game play. Fantasta players can also collect promises, dares, secrets, etc on their gestural game device, and later trade them, or share them, or gift them.

While the game may be played face-to-face in a local venue, Fantasta may also be shared with a much wider audience of players, called the Stream Team. The Stream Team may, via a network connection with the gestural game device, view video-streamed games, and vote in real time to determine game outcomes. For example, while the digital contents of game devices may remain unknown to local players, a larger audience can view offerings of losing players, and determine which promise a winner should receive.

The gestural game device may be microprocessor-based. The gestural game devices may have on-board accelerometers, gyroscopes, magnetometers, near field communications chips for proximity detection, and other electronic sensors. The gestural game devices may also control various output such as light emitting diodes and haptic buzz motors, to inform the player of the success or failure of gestures, for example. As such the gestural game device may provide various functions, including governing game mechanics, monitoring and enforcing game rules, and dispensing game rewards.

The gestural game devices may, in some embodiments, be designed, manufactured, distributed and sold in the form of fashionable jewelry, such as pendants, brooches, hatpins, bangles, belt buckles, and bracelets. Gestural game devices that are wearable may advantageously be more user-accessible than a mobile communications device, e.g. a smart phone or a tablet. As fully-dedicated game hardware, the sensors of the gestural game devices may also be more accurate and faster than smart phone sensors. Gestural game devices may wirelessly sense other game devices via near field communications in some embodiments, and can locally connect via low-energy bluetooth to other gestural game devices.

Gestural game devices may be wirelessly paired via low-energy bluetooth with an iOS or Android smartphone that is running a Fantasta back-pocket-app, to connect the gestural game device to Fantasta game servers via a cloud computing network. Some of the benefits of being in communication with Fantasta back-end game servers are described below.

Games using the gestural game devices can be played anywhere, including local retail venues such as bars, cafes, malls, restaurants, pizza parlors, bowling alleys, etc.

Game play with Fantasta game devices may also include the use of players' smartphones, for streaming game video, for x-ray examinations of a game device to reveal its digital contents, for dispensing game hints, and for many administrative functions such as setting up a game appointment, or setting up a time and date to keep a digital promise.

The Fantasta back-end game servers allow local retail venues to convert existing promotions inventory to instant real-world game rewards, such as food, drink, clothing, entertainment, and anything a retailer might want to give away in order to acquire, retain, or monetize consumers. During game play using the gestural game device, game winners may occasionally receive instant real-world game rewards from the retail venue they are playing in, or a retail venue seeking their patronage.

Fantasta game rewards are structured so that sponsored promotions may be delivered via the Fantasta back-end game servers, via the local venue directly, and/or via game players. As such a game player may select a sponsored reward, and store it in their game device, where it can be won or lost in a game with other players.

BRIEF DESCRIPTION OF THE DRAWINGS

In the following drawings, like reference numbers are used to refer to like elements. Although the following figures depict various examples, the one or more implementations are not limited to the examples depicted in the figures.

DETAILED DESCRIPTION

The Fantasta ecosystem features the following innovations: a game interface, a gestural game device, a form factor, social game mechanics, a business framework that leverages promotions inventory into instant physical game rewards, and the rewards server technology that facilitates a supply chain of rewards.

Game Device. The Fantasta gestural game device is a wearable gestural game controller. It may include a small handheld microprocessor with the form factor of a fashionable stylish pendant or pin or other jewelry, that permits small groups of local players sit face to face, and tap, bump, wave, wiggle or shake, in order to play a variety of bar games, dating games, sports games, rhythm games, and puzzle games.

Form Factor. Fantasta game devices may be designed, manufactured, distributed and sold in the form of fashionable jewelry, such as pendants, brooches, hatpins, bangles, belt buckles, and bracelets.

Figure 1A:
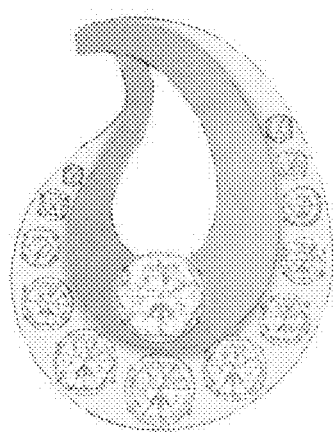
FIGS. 1A-C show examples of a wearable gestural game device having an interface used in various games in accordance with some embodiments.

Game Interface. The Fantasta gestural game device interface may include light emitting diodes known as LEDs and a haptic buzzer. The LEDs may be hidden beneath sparkling gemstones, or materials resembling gemstones. The gemstones may amplify the lighting effects and reduce the appearance of technology, while advancing both fashion and a sense of enchantment. The internal haptic motor may be hidden from players, and may provide a vibration sensation to players to indicate game status. FIG. 1A shows an example of a gestural game device having the described interface. The Fantasta Interface in device 100 includes surprize lights and game lights. In this exemplary model, a single central surprize light is surrounded by 12 game lights.

Two types of LED may be utilized in exemplary embodiments to communicate with a user. One type of LED is a "SurPrize" light, which may indicate the number of social pacts or the type of social pacts digitally hidden inside the gestural game device. A given gestural game device may have one or more of this type of LED.

A second type of LED, called a game light, may be clustered with other game lights, in a circle, or spline, or similar shape or grouping. The game light may enhance player experience by informing the player of game states, game mechanics, or game rewards. The game lights may flash on and off at various frequencies, and in various sequences, with each sequence carrying a special meaning in the context of game play. Game lights can chase and move around on a single gestural game device. Game lights can also flicker and move between gestural game devices.

LED color may also play a significant role. For example, the game device may provide instructions in the form of blue lighting effects. A successful gesture may trigger a green game light sequence. Negative feedback from game lights may be red and may also accompanied by a haptic buzz from the internal haptic motor.

Game light LEDs may also be used to display game hints during game play. These hints can be simple letters, or simple graphics, such as hearts or moons or stars. When a player shakes their gestural game device at the appropriate time, these images may appear to float in place, along the shake trail. This is achieved by manipulating LED frequency in concert using a persistence of vision lighting pattern, or POV, that can cause an image to be displayed when the gestural device is waved.

Wearable Game Device Fasteners. A single gestural game device can be carried around in a pocket, or the gestural game device may be a wearable device. Fantasta wearables can snap into a bejeweled base that holds the game device, so that the gestural game device is readily available for game play.

Figure 1B:
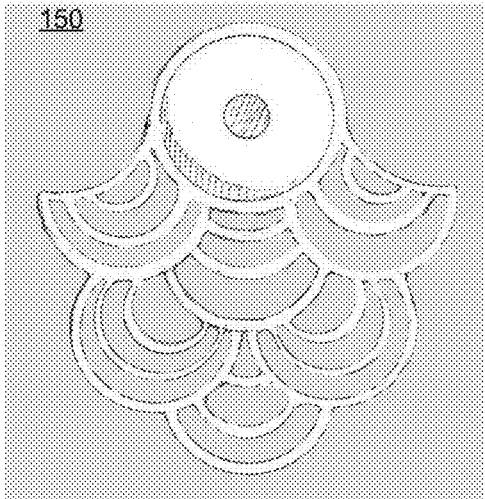
Figure 1C:
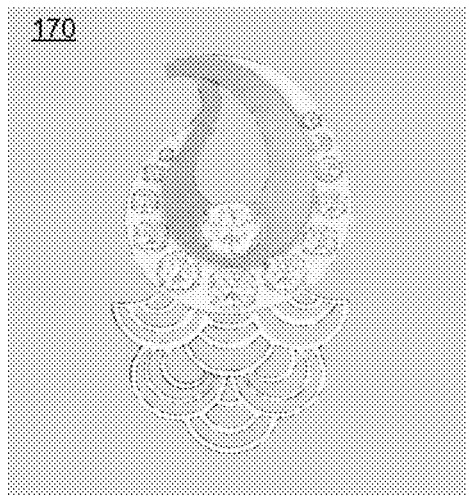
Figure 2:
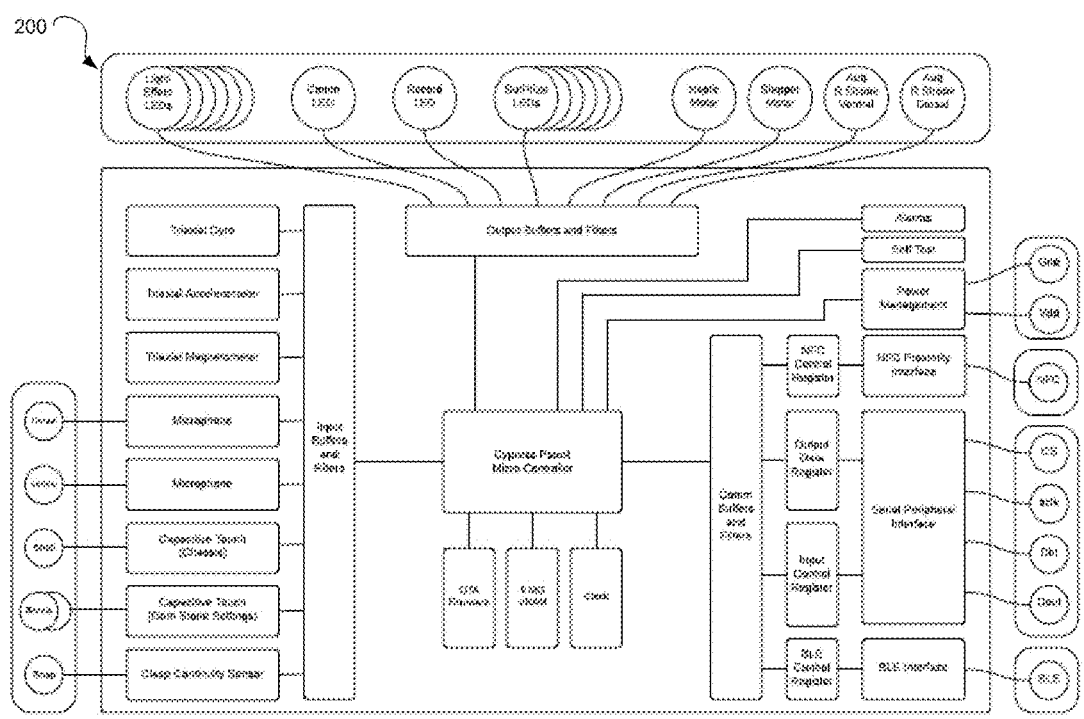
FIG. 2 illustrates an example of a Gestural Game Device, in an embodiment.

FIG. 1B illustrates a sample device base 150. The device base 150 is a brooch that can be worn as any other brooch. It may secure to a player's lapel, and serve as a base for a gestural game device. The small circle in the large circle of FIG. 1B is an empty snap that can hold a gestural game device in place. FIG. 1C illustrates a gestural device secured within a device base. Combination 170 shows the same brooch base as in FIG. 1B, but now with a gestural game device (e.g., the device from FIG. 1A) secured within.

In an embodiment, the mechanical securing feature of the device base can also be an electro mechanical fastener, allowing players to clasp and release game devices with voice control. The snap and release feature permits interchangeability: a single game device can be transferred as desired to multiple base jewelry, such as hatpins, bangles, bracelets, buckles, or pendant chains. This feature also permits multiple types and styles of game device to be swapped in and out of a single jewelry base.

Local Multiplayer Game Genre. Conventional electronic game genres depend on graphics, video, text, audio, screens, and speakers for player interaction. The Fantasta gestural game device, however, may communicate with players using only voice, gestures, lighting effects, and haptic feedback. As such, the gestural game device may serve as an extension of hands and fingers, as it unobtrusively and quietly monitors and governs game behavior from its ambient position outside of the gaze and focus of players. This leaves the players completely free to continually and effortlessly focus on human contact, intimacy, play, and game strategy. It greatly decreases the need to look at, or address, or concentrate on the game device itself. Hence the use of the Fantasta gestural game device gives rise to a new genre of game called "Eyeball Games." Eyeball Games may include elements from other game genres, such as casual games, social games, skill games, and strategy games.

The gestural game device may be an extension of the hand, and may operate in the players' periphery, encouraging eye contact and continuous play. Example game play using the gestural game device is explained in greater detail in FIGS. 13-18.

Game Device System. An exemplary gestural game device system, such as gestural game device 200, may include five (5) primary subsystems. [1] An inertial measurement unit (such as a 9DOF IMU) captures all gestural controller movements, and passes this data to the processor and communications subsystem. [2] The processor (e.g., a Cypress PSoC 4 or similar microprocessor) and wireless communications subsystem (e.g., a Bluetooth low energy, or BLE, communications subsystem) may temporarily store, then send captured data to [3] a local preprocessor on the game device, (e.g., local application layer that handles most frequent and routine gestures, game mechanics, and effects, and/or onto [4] a host application, which may be on a smart phone of a user, may take the data sent by the communications subsystem and interpret the gestures accordingly, and may send feedback to the player via the gestural game device, and manage the game environment. The exemplary gestural game device may also include [5] a power subsystem, which may handle charging and smart sleep state transitions.

Basic Component Breakdown. Each Fantasta gestural game device may include an inertial measurement unit and temporary memory. The gestural data from the inertial measurement unit may be cached in the temporary memory for rapid transmission to either the local preprocessor system or the host system for analysis and feedback handling. All communications between the device and the host system may be via Bluetooth Low Energy (BLE) transceiver and may be coordinated by the processor. Each Device may also be equipped with a Near Field Communications (NFC) tag and reader chipset for proximity detection to other gestural game devices. The gestural game device may also include a single-button interface, through which a device state in various games may be changed through press count and press/hold of the button. Additionally, the device may feature LEDs capable of displaying hundreds of different output routines and a haptic feedback motor for providing direct, tactile feedback to the player (as described above).

Touch Input. The gestural game device may also support human touch input. The chassis, or form factor, may capacitively detect when it is being held, and the bevels holding the gemstones can be individually touched to activate various game functions.

Voice Input. The gestural game device may also support voice commands. A microphone on each side of the game device may receive voice commands to activate various game functions, such as game selection, or game start. An interface LED dedicated to voice functions may indicate when a voice command has been heard, a player name recognition, or indicate when a player may voice record during game play.

Power Management. Gestural game device power may be supplied by an internal rechargeable battery. The recharge interface may, in an embodiment, utilize the USB Micro standard for maximum interoperability. Power management may be microprocessor-based, and low battery conditions may trigger player notifications. In further embodiments, devices may be recharged over the air from a dedicated cradle.

Figure 3:
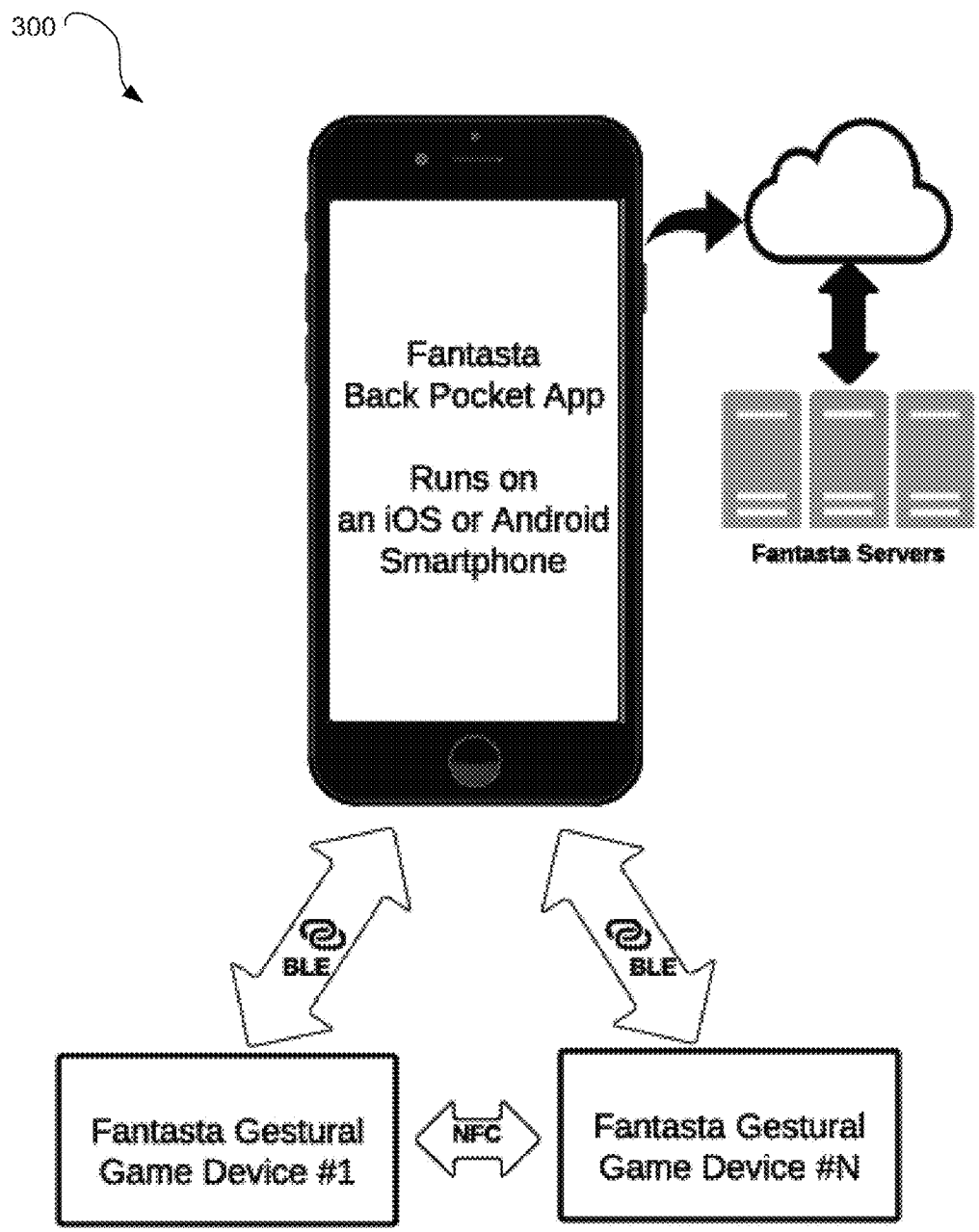
FIG. 3 illustrates a block diagram of an exemplary gestural game device in communication with a host application on a mobile communications device and back-end game servers in accordance with some embodiments.

Software & Telecom. The gestural game device may be used with a fully-featured host application that runs on a player's mobile communications device (e.g., a smartphone). This back pocket app will run on both Android and iOS platforms, for example. FIG. 3 shows a system diagram of an exemplary gestural game device in communication with a host application on a mobile communications device and back-end game servers.

As shown in FIG. 3, the host app subsystem may handle some, most, or all host-side communications, gesture interpretation, and player feedback, depending on game type, game complexity, and player count. The host app software may coordinate communications with all game devices in use during a game, and may manage the current game state. Gesture recognition and noise filtering algorithms may be employed by the host app software to ensure that the system accurately interprets all player's gestural and movement input. The host app may send feedback to the game devices in the form of haptic feedback and LED output, according to the current game state.

All players may use smart phones to interact with the back-end game server for social, administrative, marketing, and merchandising purposes, but only one phone with the app installed and running may be required for a single game. A single smartphone running the Fantasta back pocket app may support as many game devices as needed in a game (e.g., five, ten, or fifteen devices).

Additional players can be added by chaining smartphones and devices in various serial and/or parallel communications protocols. Processor and network speed, associated lag time, and impact of lag time on player experience may be factors in deciding whether or not additional players may be added to a game running on a single device.

The host application may also support significant administrative and merchandising and marketing functions, in addition to the features described above. Furthermore, the host application may also be used in games where mobile device sensors may also be used for gesture capture, such that some games can be played with game devices and/or smartphones at the same time.

Figure 4:
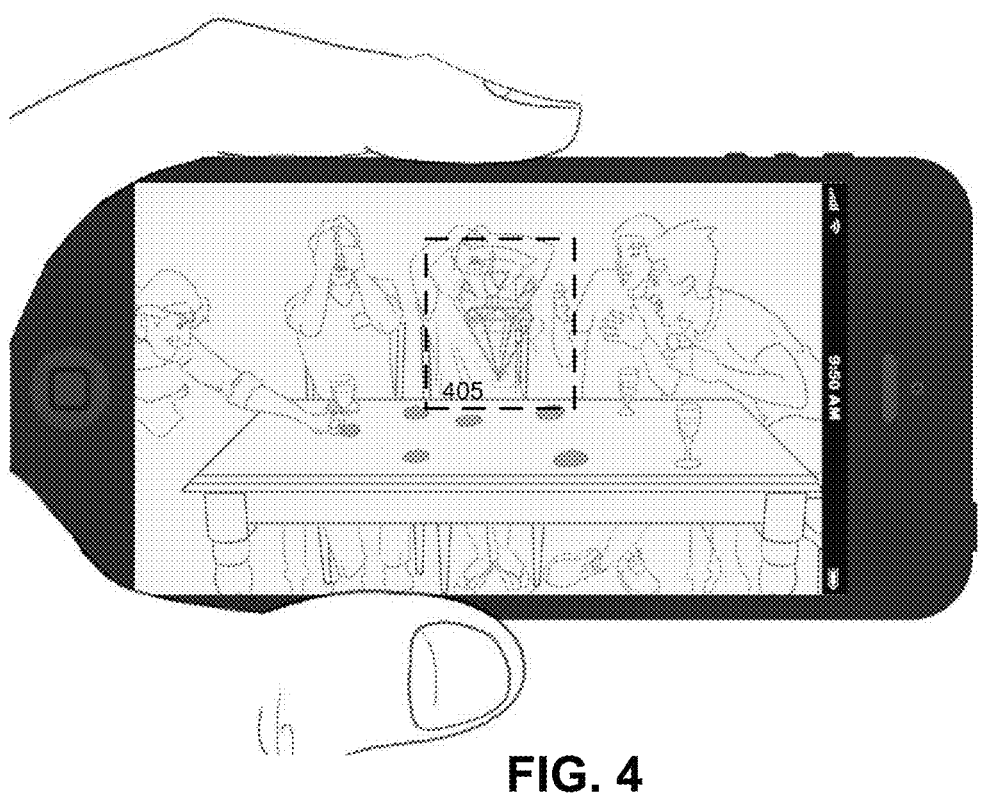
FIG. 4 shows an exemplary gestural game device displaying game graphics in accordance with some embodiments.

Augmented Reality Strobe. The Fantasta game device may also include two or more strobe lights, that are invisible to the human eye, but detectable to a smart phone camera. These strobe lights may allow smart phone cameras to detect the location of the Fantasta game device, and its various game states, and to display game mechanics, and associated player names and player metrics. Thus players who watch games through their phones, and players who watch streamed games in their homes, can see special graphical representations of hidden promises, dares, secrets, and other social contents stashed inside a player's game device. Smart phone cameras running the host app can detect a gestural game device, and display simple game graphics, such as the floating gem 405 shown in FIG. 4.

Game Hint Lighting Effects. The social content in a game device may be hidden by design in certain games. However, the gestural game device may include the ability to display hints about data stored on the gestural game device. Microprocessor control of LED frequency and timing, in conjunction with accelerometer and magnetometer positional data, can be used to conjure simple colorful shapes, such as a heart or a baseball or a star. This may be accomplished by shaking the game device until an image forms along the shake trail. This perceptual effect is called persistence of vision, or POV.

Mechatronic Effects. The gestural game device may also include a stepper motor to be used for various special effects, including voice commands that release a game device from its jewelry base, game logic that opens and closes secret chambers, or retracts to open and/or cover gemstones, and other similar mechatronic effects that enhance game play.

Unique Gestures. Gestures using the gestural game device may be used to control and advance game play. The game device may recognize many simple unique hand gestures, such as tap, shake, bump, wave, and wiggle, etc. There are also several ways to tap, for example on a table, on another game device. And there are several ways to shake, for example beside your ear, or in someone's face. And there are games that call for double tap, or triple bump. As such Fantasta has a significant library of gestures that start, pause, quicken, slow down, or otherwise advance game play. Unique gestures can also be recorded live during game play and recalled for later use. A documented API may permit game developers to specify and customize unique gestures for game play. A specialized authoring and editing system, employing design conventions used by orchestra conductors and lighting designers, for example, may serve as a front end to the API.

Figure 5A:
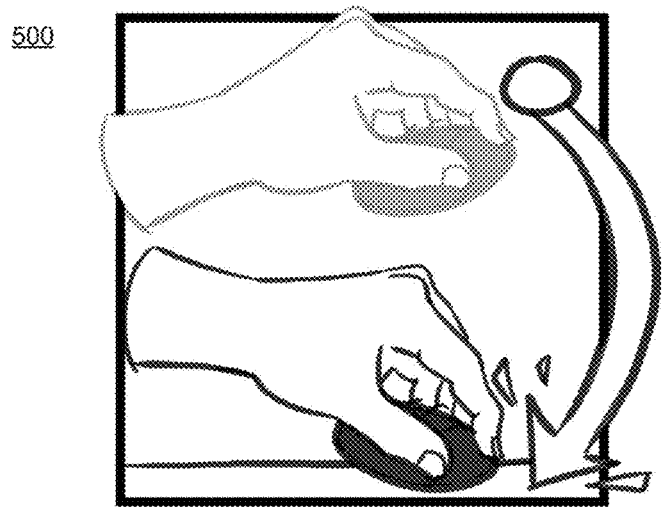
FIGS. 5A-E show examples of different gestural inputs for games using the gestural game device in accordance with some embodiments.
Figure 5B:
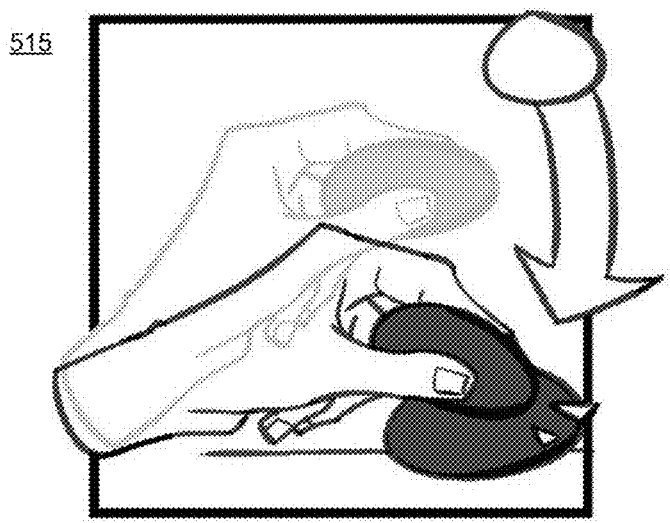

FIGS. 5A-E display five examples from the Fantasta library of unique game gestures, including device bump, table tap, ear shake, haggle wag, and circle swipe. FIG. 5A displays an exemplary embodiment of the game gesture Device Bump. This gesture 500 may triggered by moving one game device vertically against another. This gesture may serve a few different purposes in the game environment, including starting the game, and adding additional players. FIG. 5B displays an exemplary embodiment of the game gesture Table Tap. This gesture 515 may be triggered by tapping the game device on a flat surface such as a table. In the game environment, this gesture may continue the game, signal that each player is ready, and trigger a victory event.

Figure 5C:
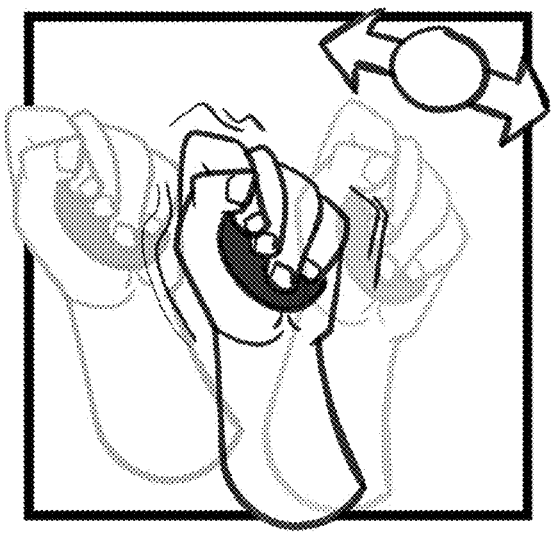
Figure 5D:
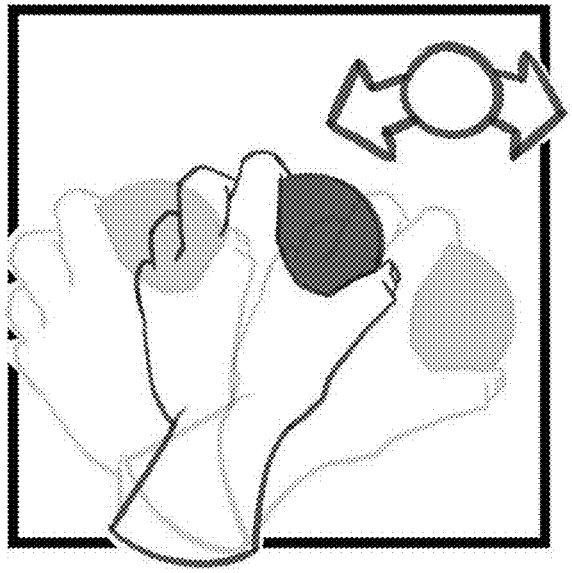
Figure 5E:
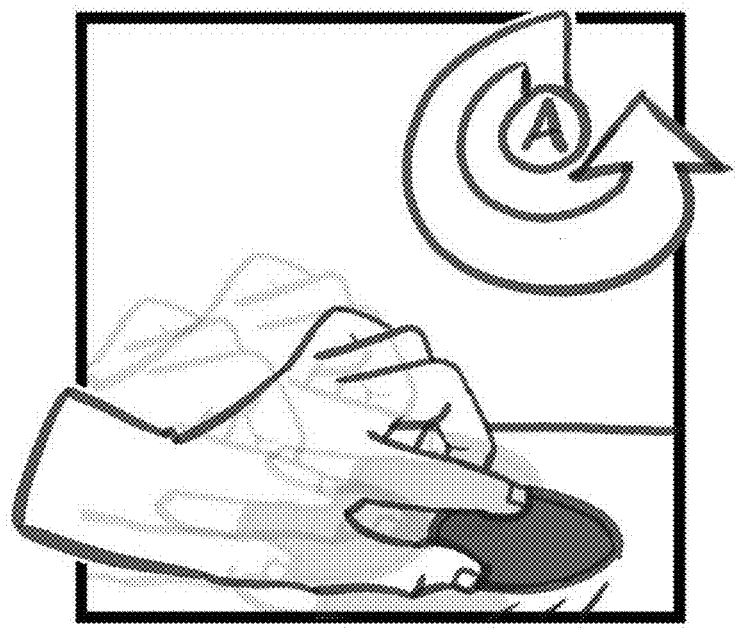

Additionally, FIG. 5C displays an exemplary embodiment of the game gesture Ear Shake. This gesture 530 may be triggered by moving the game device linearly without bending the wrist. In the game environment, this gesture may be used to continue the game in response to other game events. FIG. 5D displays an exemplary embodiment of the game gesture Haggle Wag. This gesture may be triggered by moving the game device in a semicircular motion by rotating the wrist back and forth without rotating the hand. In the game environment, this gesture may trigger or respond to game events. Lastly, FIG. 5E displays an exemplary embodiment of the game gesture Circle Swipe. This gesture 560 may triggered by moving the game device in a circle on the tabletop in a "wax on" motion. In the game environment, this gesture may trigger or respond to a game event.

Figure 6:
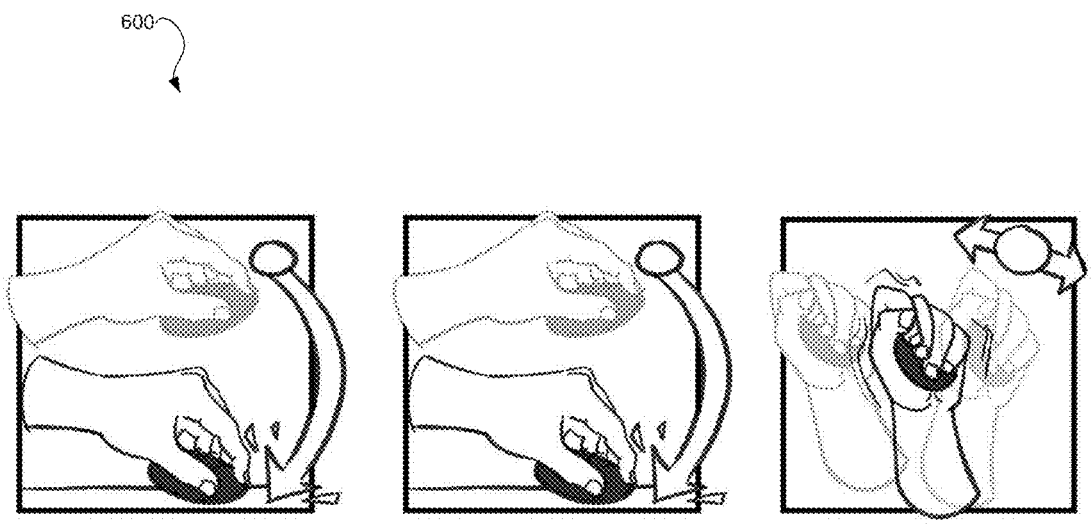
FIG. 6 illustrates an example of a gestural sequence including multiple gestures for use in games utilizing the gestural game device in accordance with some embodiments.

If simple unique gestures, such as those documented above, are the Fantasta alphabet, gesture sequences may be words used in games involving the gestural game device. For example, FIG. 6 displays an exemplary embodiment of a "tap tap shake" sequence 600, which may be used to start a game that prominently features these gestures. Because there are many single gestures, many gesture sequences, and many games using the gestural game device, a graphic symbology may be used as a mnemonic aid, to help players quickly identify and recall hand gestures and game mechanics.

Some gestures may be defined to trigger a game action only when specifically used in concert with other players. For example, when a specified number of players simultaneously execute the circle swipe gesture at the same time, the players' local circle may be expanded to include off site players, who can then watch streamed video of a game, and vote on player actions, outcomes, and rewards.

Gestural game devices that are purchased together may have access to a special class of gestures with special functionality not available to game devices that are purchased singly. This may permit players that purchase devices together to collectively antagonize or support other players. These special gestures may allow giving or receiving game hints, rendering game elements visible or invisible, slowing down or speeding up game play, or the ability to find, view, capture, tag, follow, or multiply game rewards, etc.

While device link allows for a subclass of gestures, it may be used as a merchandising tool within an effective merchandising framework that encourages and facilitates multiple or group sales. This specific group merchandising technique has not been previously used in other shopping or retail formats.

Digitally stored social obligations (DSSOs), also referred to as "SurPrizes," may be a currency of games using the gestural game device. A DSSO may, for example, be a promise or dare or other social vow that can be made between winners and losers at the end of any game.

Game design may leverage DSSOs to encourage or facilitate eating, drinking, merrymaking, and socializing. A DSSO may be a promise to go somewhere and do something with someone. "I promise we will go to the movies." Or a DSSO can be a dare in which one friend challenges another friend to try something new. "I dare you to go bungie jumping with me." Or a DSSO can be an extortion to disclose certain secrets or truths amongst friends. "I'll tell you what he said last night if you buy me a double cappuccino." Whatever the flavor of social obligation, a DSSO can be either a commitment to a player, or a commitment from a player. In either case a DSSO is a commitment between two players.

A DSSO may have three stages. In stage 1) a DSSO is conceived by each player in advance and loaded into their gestural game device. In stage 2) the DSSO is accepted and agreed upon by two players during game play, and 3) the DSSO is fulfilled at a later date and time.

DSSO stage 1—Before The Game. Like a programmable poker chip, data describing a DSSO may be stashed inside a game device prior to game play. In advance of game play, players create and assemble vows, promises, social obligations into a short simple list, called a game plan. DSSOs may be written and edited, or spoken and recorded.

Depending on the type of game device, or the status of the players, or the type of game, DSSOs can be drawn from a variety of alternative 3rd party sources, and also inserted into a player's game plan:

A list of suggested DSSOs, by Game Designers, including funny, famous, silly, serious, romantic, etc.
A list of suggested DSSOs, from sponsors and/or venues.
A list of DSSOs previous won in earlier games and presently still owed by you.
A list of DSSOs previously won in earlier games and presently still owed to you.

Figure 7:
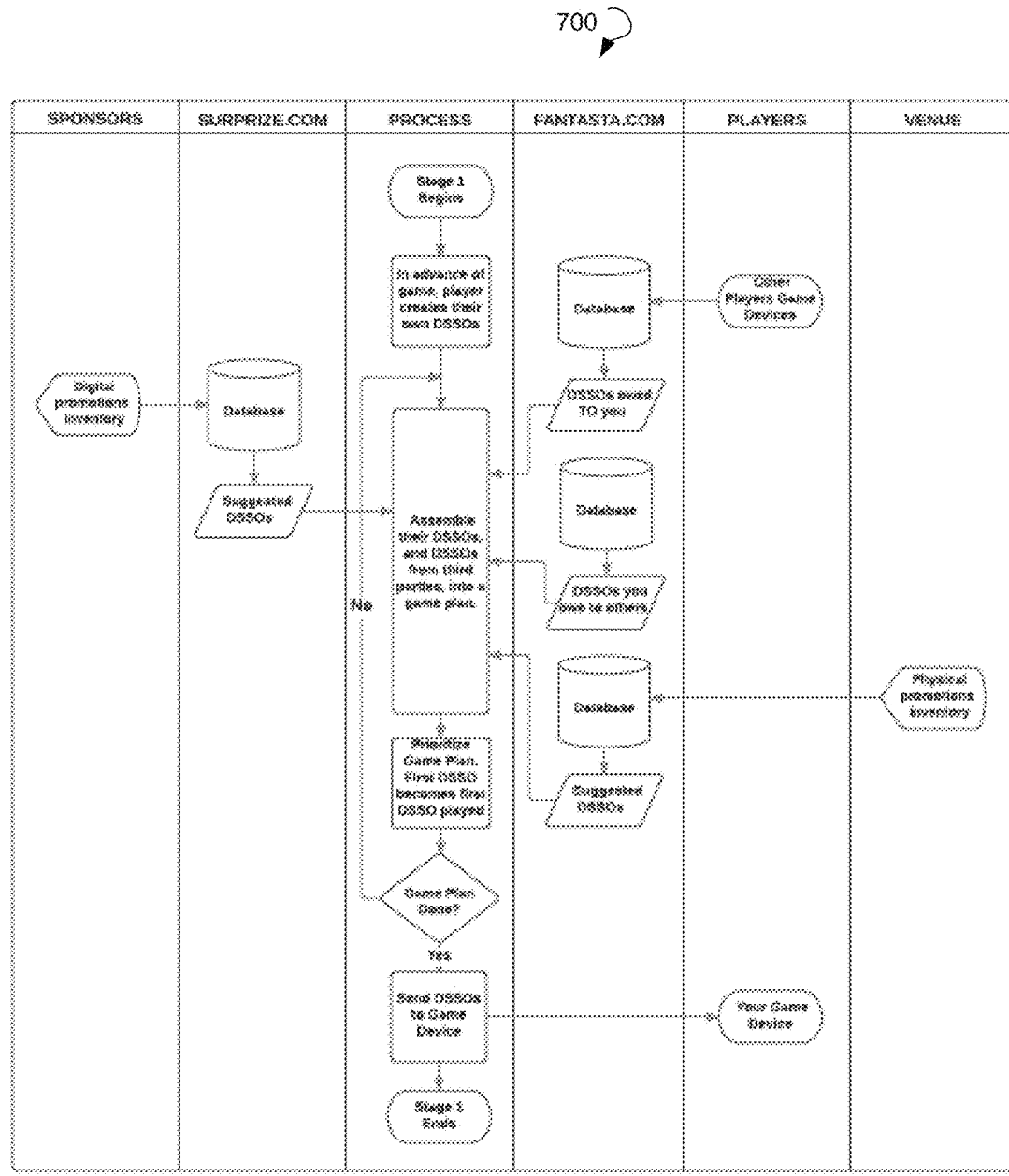
FIG. 7 illustrates a flow diagram of an exemplary method for utilizing DSSOs prior to a game in accordance with some embodiments.

Once the game plan is made, the DSSOs can be organized and prioritized, such that the first DSSO at the top of the game plan is automatically loaded into the player's game device. After that DSSO is played, the second DSSO from the game plan is automatically loaded into the game device, and played, etc. In some games only one DSSO will be played at a time. In more advanced games multiple DSSOs can be played at a time. FIG. 7 illustrates a sample flow 700 of how DSSOs may be utilized prior to a game.

DSSO Stage 2—During The Game. During game play, the DSSO stored inside the game device may be hidden from all other players. The nature of the DSSO in the game device is known to back-end game servers, and this knowledge may influence game mechanics and game advancement in some embodiments.

When a game using the gestural game device is won, the winner may select one loser, and ceremoniously take that loser's DSSO from their game device. Data corresponding to the particular transferred DSSO (e.g., to go to the movies, or to go bungie jumping, or to have coffee) may then be stored on the winning player's gestural game device. The winner and loser accordingly would have an agreement to execute that DSSO at a later date and time.

In certain games, or in the case of game hints, it is only after the DSSO is transferred that it can be electronically revealed or validated. For example, a host application on a mobile communications device may have an x-ray function that can reveal DSSOs on a gestural game device. The DSSO discussed during game play (e.g., to go to a museum) may or may not turn out to be as described or expected. (e.g., it may actually be "I promise you my red clown nose collection.")

Figure 8:
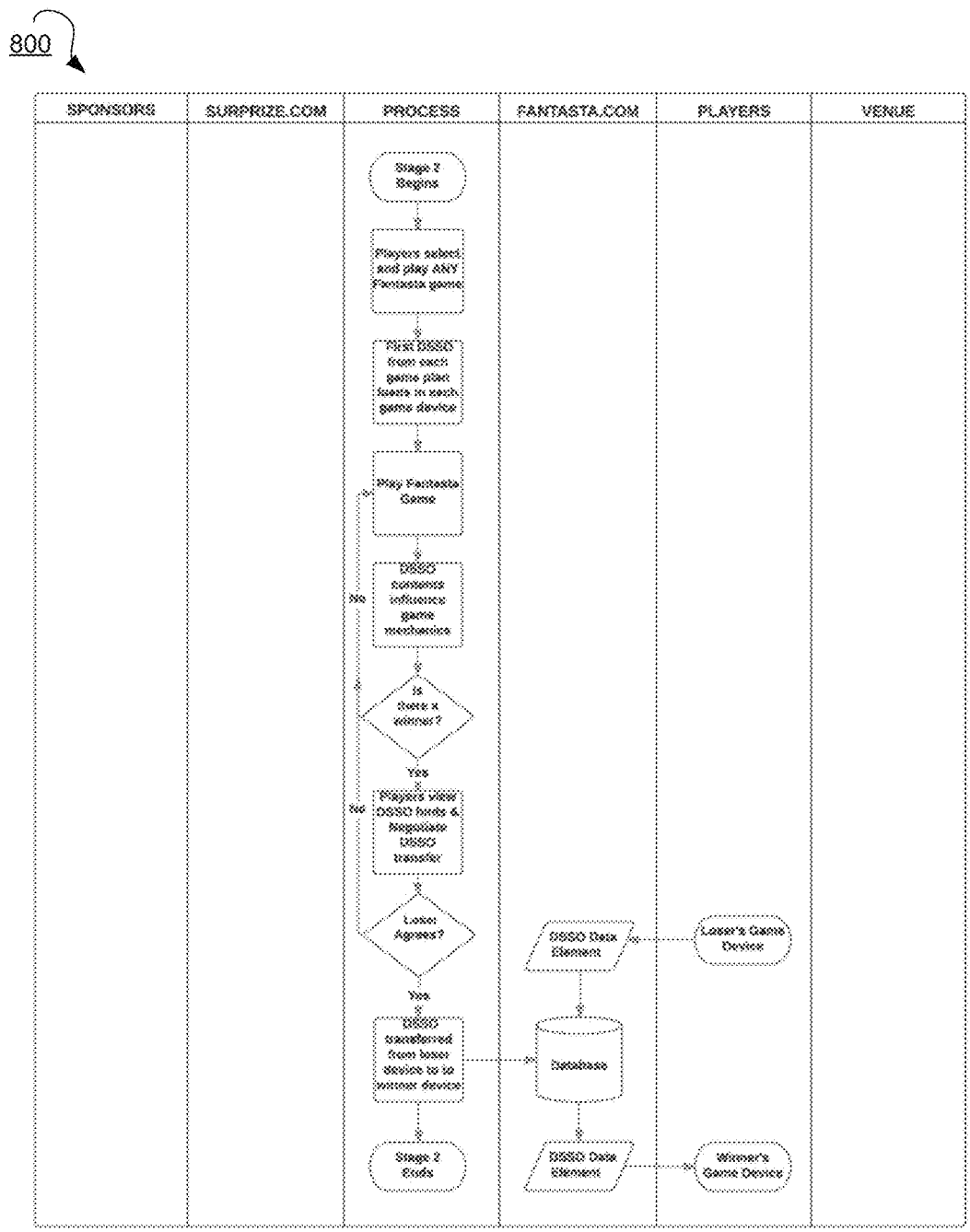
FIG. 8 illustrates a flow diagram of an exemplary method for transacting a DSSO during a game in accordance with some embodiments.

After a DSSO transfers from loser to winner, the loser's game device may automatically increment and load the next DSSO from their game plan, to be ready for the next game. The winner's game device may store the loser's DSSO data until the DSSO is fulfilled at a later time. FIG. 8 illustrates a sample flow diagram 800 showing DSSO transaction during a game.

DSSO Stage 3—After The Game. At a later date and time, the winner and loser of a game may meet in person to fulfill their DSSO. For example they will go to a movie together, go bungie jumping together, or have coffee together, etc.

The time and date and place of their meeting may already be agreed upon as part of the DSSO, or setting the date and time of DSSO fulfillment is facilitated by the back-end game server, in the form of notifications and other social media sent to and from the participants.

Figure 9:
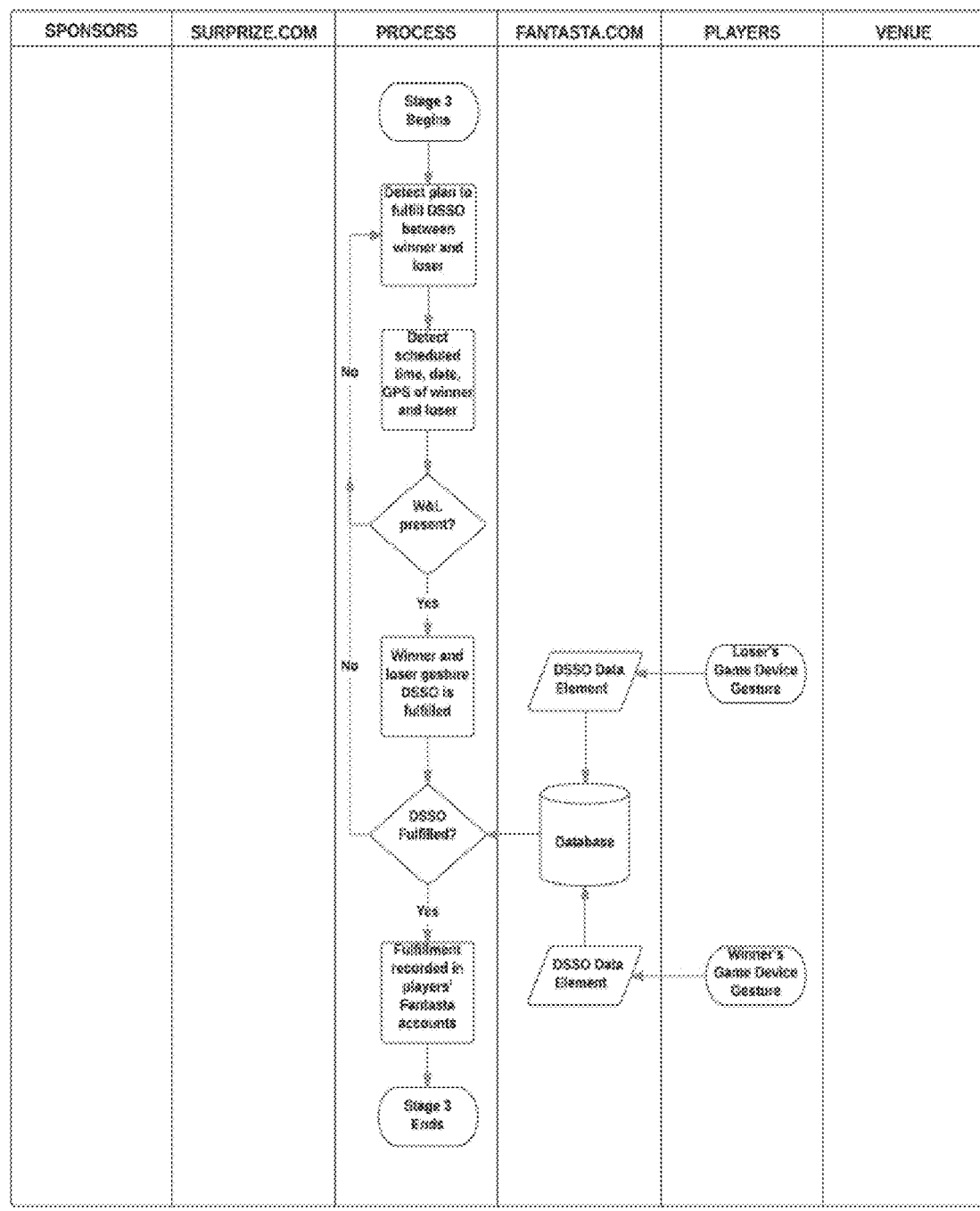
FIG. 9 illustrates a flow diagram of an exemplary method for fulfilling a DSSO stored on a gestural gaming device after a game in accordance with some embodiments.

The DSSO parameters may be known to back-end game servers, e.g. the purpose of a meeting, the meeting place, the date, the time, etc. GPS coordinates associated with the DSSO may also be known to the Fantasta servers. In an embodiment, when GPS coordinates of the winner and loser indicate that fulfillment is possible and pending, and in response to the winner and loser using their gestural game devices to execute a particular fulfillment gesture, the DSSO is officially fulfilled. A record of their social obligations being met may be logged (e.g., at the back-end game server), and player accounts associated with the participants stored on the game server may be accordingly updated. FIG. 9 illustrates a flow diagram of an exemplary method 900 for fulfilling a DSSO stored on a gestural gaming device after a game in accordance with some embodiments.

DSSO Score. The percentage of obligations made versus obligations kept may serve as a player's badge of honor, and may essentially be a player's game score. For example, a player may have 45 obligations for a given time period, but only 39 of them have been honored or fulfilled, resulting in a ratio of 39/45 or 87%. This player statistic, also known as a "Pact Factor," may be displayed wherever the player's game name appears (e.g. on a web site associated with player accounts).

DSSO Trading. A winner may keep a DSSO, or transfer it again in a new and different game with new players. As such, a loser's DSSO may be transferred from one winner to an entirely different winner in some embodiments. As such winning or losing promises, dares, secrets, dates, etc., is just one aspect of gestural game device game play. Game winners can also collect promises, dares, secrets, and all DSSOs on their gestural game device, and later trade them, or share them, or gift them.

Rewards Server. The described game ecosystem offers the ability to turn existing promotions inventory into real-time real-world game prizes, that can be instantly awarded to game winners on retail premises via the gestural game device. Using a web-based dashboard, a national brand or local retail venue can tag, track, and deliver both digital and physical promotions to Fantasta game winners.

The big data engine behind the dashboard may be a rewards server that is part ad server, and part supply chain server. The ad server component may monitor game mechanics, and in concert with previously stored player choices, measure and learn about player intent. Using data collected regarding player intent, the ad server component may then match the identified player intent to promotions inventory with a reward provider associated with the identified player intent. The supply chain server component may then manage the delivery of that inventory to game winners. Four exemplary ways in which the described game ecosystem can deliver digital and/or physical promotions include:

Player to player rewards. During stage 1 prior to any game, when a player is composing their game plan, sponsored DSSOs may be made available to players, so that players may plan to give certain digital promotions to other players. (e.g., a player inserts free appetizers in their game plan, right after their promise to go bungie jumping, but right before their promise to check out an art gallery.)

Player bonus. After Stage 2, when a game has ended, a separate digital bonus, in addition to any DSSO, may be offered to one or all of the players. (e.g., this is your 10th game at this location, also all players get get free appetizers.)

Player suggestion. After Stage 2, when a game has ended, and for a predetermined number of days after that, game notifications, and other social media, will suggest places, times, dates, and ways that the winner and loser can fulfill the social obligation that was defined during game play. (e.g., for promises to go to the movies, movies would be suggested, as well as movie theaters, restaurants near the movie theatre, etc.)

Venue to player rewards. During Stage 2 when a DSSO is won or lost, and during stage 3 when a DSSO is fulfilled, the retail venue may be notified by the back-end game server, in concert with the retail venue's plans defined in the dashboard, to deliver a real world physical promotion to a player or players, in the form of an instant game reward.

Figure 10:
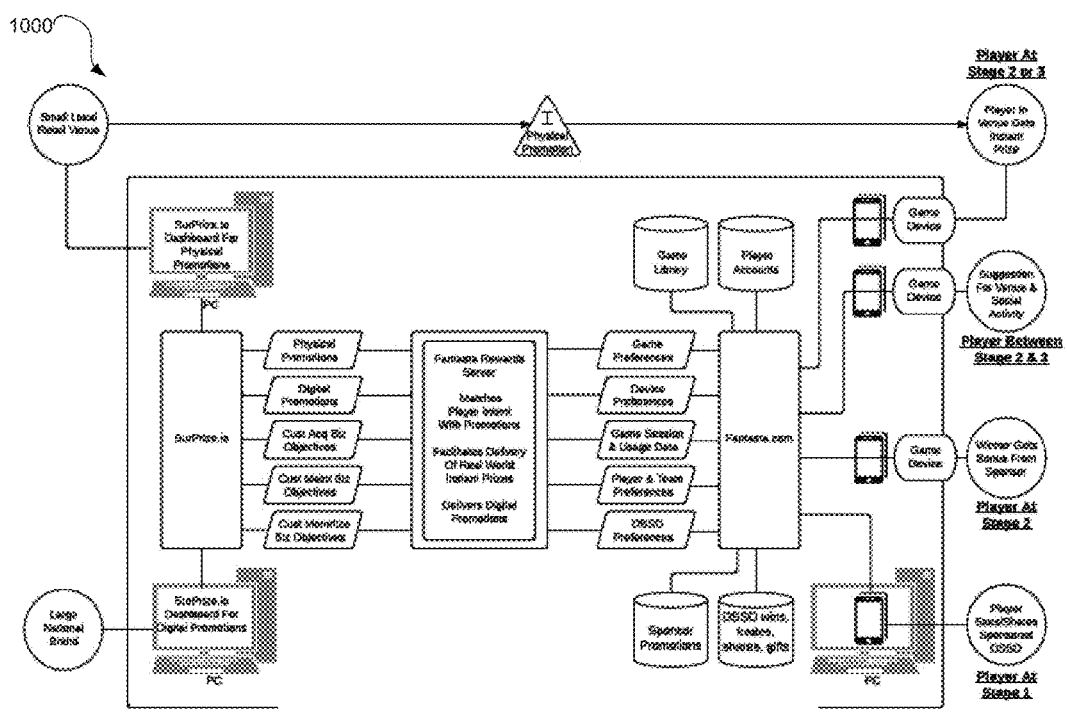
FIG. 10 illustrates a block diagram of an exemplary system for storing and transacting game-related rewards in accordance with some embodiments.

FIG. 10 illustrates a block diagram of an exemplary system 1000 for storing and transacting game-related rewards in accordance with some embodiments. The exemplary Fantasta Rewards Server, shown in system 1000, may be a big data engine that evaluates player behavior, measures player interest, calculates player intent, and matches it with sponsors' inventory of real world promotions, and digital promotions, and manages the supply chain and delivery of those promotions.

Figure 11:
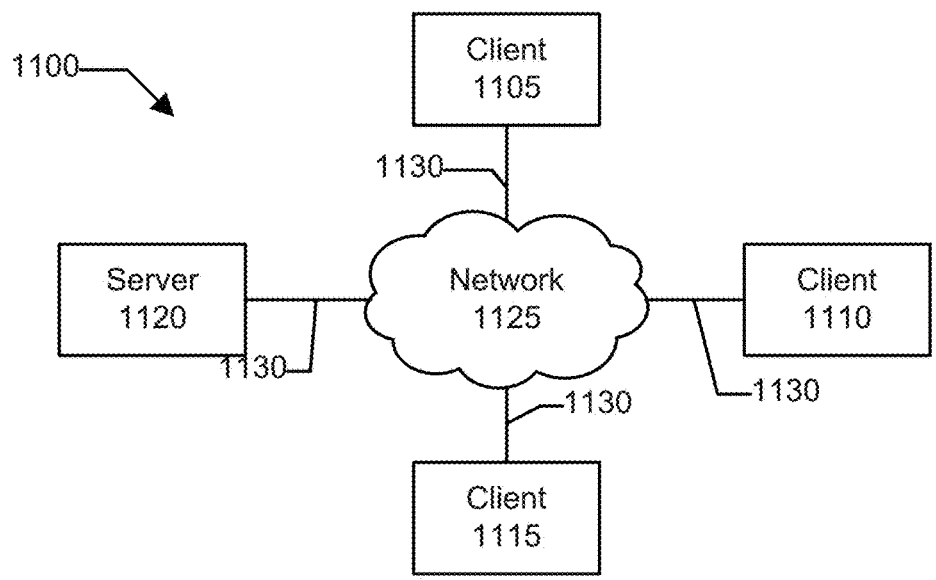
FIG. 11 shows a simplified block diagram of a distributed computing network connecting a server and devices in which a platform for a gestural gaming device may be implemented.

FIG. 11 is a simplified block diagram of a distributed computer network 1100 incorporating a specific embodiment of the present invention. Computer network 1100 includes a number of mobile client systems 1105, 1110, and 1115, and a server system 1120 coupled to a communication network 1125 via a plurality of communication links 1130. Communication network 1125 provides a mechanism for allowing the various components of distributed network 1100 to communicate and exchange information with each other.

Communication network 1125 may itself be comprised of many interconnected computer systems and communication links. Communication links 1130 may be hardwire links, optical links, satellite or other wireless communications links, wave propagation links, or any other mechanisms for communication of information. Various communication protocols may be used to facilitate communication between the various systems shown in FIG. 11. These communication protocols may include TCP/IP, HTTP protocols, wireless application protocol (WAP), vendor-specific protocols, customized protocols, and others. While in one embodiment, communication network 1125 is the Internet, in other embodiments, communication network 1125 may be any suitable communication network including a local area network (LAN), a wide area network (WAN), a wireless network, an intranet, a private network, a public network, a switched network, and combinations of these, and the like.

Distributed computer network 1100 in FIG. 11 is merely illustrative of a specific embodiment incorporating the present invention and is not intended to limit the scope of the invention as recited in the claims. One of ordinary skill in the art would recognize other variations, modifications, and alternatives. For example, more than one server system 1120 may be connected to communication network 1125. As another example, a number of mobile client systems 1105, 1110, and 1115 may be coupled to communication network 1125 via an access provider (not shown) or via some other server system.

Mobile client systems 1105, 1110, and 1115 typically request information from a server system which provides the information. It should be appreciated, however, that information can generally flow in both directions (e.g., a backup service primarily sends data from clients to server), but the server is the service provider. Server systems by definition typically have more computing and storage capacity than mobile client systems. However, a particular computer system may act as both a client or a server depending on whether the computer system is requesting or providing information. Aspects of the invention may be embodied using a client-server environment or a cloud-cloud computing environment.

Server 1120 is responsible for receiving information requests from mobile client systems 1105, 1110, and 1115, performing processing required to satisfy the requests, and for forwarding the results corresponding to the requests back to the requesting mobile client system. The processing required to satisfy the request may be performed by server system 1120 or may alternatively be delegated to other servers connected to communication network 1125.

Mobile client systems 1105, 1110, and 1115 enable users to access and query information or applications stored by server system 1120. A mobile client may be referred to as a distributed mobile client. Some example mobile client systems include but are not limited to portable electronic devices (e.g., mobile communication devices) whose principle function is voice communication including the Apple iPhone®, the Apple iPad®, the Palm Pre™, or any mobile device running the Apple iOS™, Android™ OS, Google Chrome OS, Symbian OS®, Windows Mobile® OS, Palm OS® or Palm Web OS™. In a specific embodiment, a "web browser" application executing on a mobile client system enables users to select, access, retrieve, or query information and/or applications stored by server system 1120. Examples of web browsers include the Android browser provided by Google, the Safari® browser provided by Apple, the Opera Web browser provided by Opera Software, the BlackBerry® browser provided by Research In Motion, the Internet Explorer® and Internet Explorer Mobile browsers provided by Microsoft Corporation, the Firefox® and Firefox for Mobile browsers provided by Mozilla®, and others.

Figure 12:
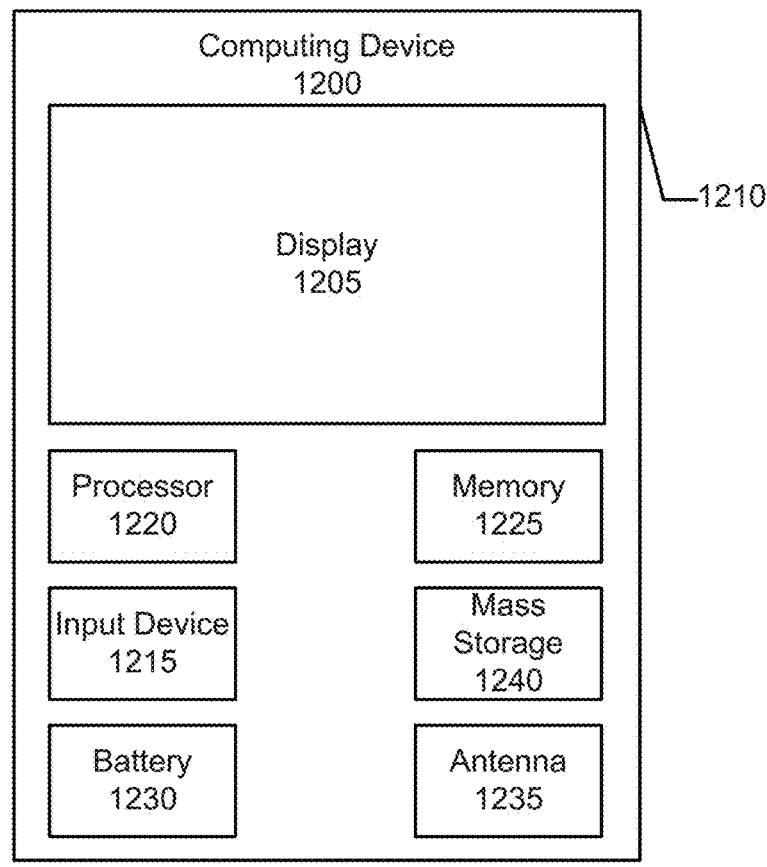
FIG. 12 shows a more detailed diagram of an exemplary mobile communications device, according to an embodiment.
Figure 13:
FIGS. 13-18 illustrate images depicting players playing a game played using exemplary gestural game devices in accordance with an embodiment.
Figure 14:
Figure 15:
Figure 16:
Figure 17:
Figure 18:

FIG. 12 shows a specific embodiment of a computer system such as a mobile client system of the present invention. In an embodiment, a user interfaces with the system through a client system, such as shown in FIG. 12. Mobile client communication or portable electronic device 1200 includes a display, screen, or monitor 1205, housing 1210, and input device 1215. Housing 1210 may house familiar computer components, some of which are not shown, such as a processor 1220, memory 1225, battery 1230, speaker, transceiver, antenna 1235, microphone, ports, jacks, connectors, camera, input/output (I/O) controller, display adapter, network interface, mass storage devices 1240, and the like and various combinations thereof. These components may be connected using any interconnection scheme or bus architecture.

Input device 1215 may also include a touchscreen (e.g., resistive, surface acoustic wave, capacitive sensing, infrared, optical imaging, dispersive signal, or acoustic pulse recognition), keyboard (e.g., electronic keyboard or physical keyboard), buttons, switches, stylus, or a combination of these.

Mass storage devices 1240 may include flash and other nonvolatile solid-state storage or solid-state drive (SSD), such as a flash drive, flash memory, or USB flash drive. Other examples of mass storage include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc), battery-backed-up volatile memory, tape storage, reader, and other similar media, and combinations of these.

The invention may also be used with computer systems having different configurations, e.g., with additional or fewer subsystems. For example, a computer system could include more than one processor (i.e., a multiprocessor system, which may permit parallel processing of information) or a system may include a cache. The computer system shown in FIG. 12 is but an example of a computer system suitable for use with the present invention. Other configurations of subsystems suitable for use with the present invention will be readily apparent to one of ordinary skill in the art.

For example, in a specific implementation, the computing device is a mobile communication device such as a smartphone or tablet computer. Some specific examples of smartphones include the Droid Incredible and Google Nexus One, provided by HTC Corporation, the iPhone or iPad, both provided by Apple, and many others. Typically, these mobile or portable computing devices have less resources (e.g., memory, storage, smaller screens, or processing power) than a desktop computer. Further, such mobile or portable computing devices are designed to be powered primarily by a battery, rather than being constantly plugged in to a power outlet as in the case of a desktop computer. So, given these differences between portable and non-portable computing devices, it is generally desirable that applications on portable computing devices be small and lightweight (e.g., consume relatively fewer resources as compared to non-portable computing devices). The computing device may be a laptop or a netbook. In another specific implementation, the computing device is a non-portable computing device such as a desktop computer or workstation.

A computer-implemented or computer-executable version of the program instructions useful to practice the present invention may be embodied using, stored on, or associated with non-transitory computer-readable medium. Non-transitory computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of the software useful to practice the present invention may be stored or reside in RAM or cache memory, or on mass storage device 1240. The source code of this software may also be stored or reside on mass storage device 1240 (e.g., flash drive, hard disk, magnetic disk, tape, or CD-ROM). As a further example, code useful for practicing the invention may be transmitted via wires, radio waves, or through a network such as the Internet. In another specific embodiment, a computer program product including a variety of software program code to implement features of the invention is provided.

Computer software products may be written in any of various suitable programming languages, such as C, C++, C#, Pascal, Fortran, Perl, Matlab (from MathWorks, www.mathworks.com), SAS, SPSS, JavaScript, CoffeeScript, Objective-C, Objective-J, Ruby, Python, Erlang, Lisp, Scala, Clojure, and Java. The computer software product may be an independent application with data input and data display modules. Alternatively, the computer software products may be classes that may be instantiated as distributed objects. The computer software products may also be component software such as Java Beans (from Oracle) or Enterprise Java Beans (EJB from Oracle).

An operating system for the system may be the Android operating system, iPhone OS (i.e., iOS), Symbian, BlackBerry OS, Palm web OS, bada, MeeGo, Maemo, Limo, or Brew OS. Other examples of operating systems include one of the Microsoft Windows family of operating systems (e.g., Windows 95, 98, Me, Windows NT, Windows 2000, Windows XP, Windows XP x64 Edition, Windows Vista, Windows 7, Windows CE, Windows Mobile, Windows Phone 7), Linux, HP-UX, UNIX, Sun OS, Solaris, Mac OS X, Alpha OS, AIX, IRIX32, or IRIX64. Other operating systems may be used.

Furthermore, the mobile device or portable computer device may be connected to a network and may interface to other computers using this network. The network may be an intranet, internet, or the Internet, among others. The network may be a wired network (e.g., using copper), telephone network, packet network, an optical network (e.g., using optical fiber), mobile network, or a wireless network, or any combination of these. For example, data and other information may be passed between the mobile device or portable computer and components (or steps) of a system useful in practicing the invention using a mobile network employing a protocol such as code division multiple access (CDMA), Global System for Mobile Communications/General packet radio service (GSM)/(GPRS), Worldwide Interoperability for Microwave Access (WiMAX), or 3GPP Long Term Evolution (LTE) or a wireless network employing a protocol such as Wi-Fi (IEEE standards 802.11, 802.11a, 802.11b, 802.11e, 802.11g, 802.11i, and 802.11n, just to name a few examples). For example, signals from a computer may be transferred, at least in part, wirelessly to components or other computers, or from mobile communications devices to other mobile communications devices.

In the description above and throughout, numerous specific details are set forth in order to provide a thorough understanding of the disclosure. It will be evident, however, to one of ordinary skill in the art, that the disclosure may be practiced without these specific details. In other instances, well-known structures and devices are shown in block diagram form to facilitate explanation. The description of the preferred an embodiment is not intended to limit the scope of the claims appended hereto. Further, in the methods disclosed herein, various steps are disclosed illustrating some of the functions of the disclosure. One will appreciate that these steps are merely exemplary and are not meant to be limiting in any way. Other steps and functions may be contemplated without departing from this disclosure.

FIGS. 13-18 illustrate examples of players playing a game played using an exemplary gestural game device in accordance with an embodiment. In image 1300, a first player speaks to a first gestural device to initiate a game. The other players may tap their gestural devices to a table in synch with a blinking LED on the first gestural device to indicate to the system that the other players will be playing the game as well. In image 1400, the first player says "one" out loud, and taps the first gestural device on the table. In image 1500, a second player says "two" out loud and taps their gestural device on the table. The game continues in similar fashion; however, for any number that includes a three, a six, or a nine, the corresponding player must remain silent instead of counting out loud, and shake their gestural device instead of tapping the gestural device to the table, as shown in image 1600. When players misspeak, improperly shake or tap, or even count out of turn, as shown in image 1700, that player's gestural device will vibrate and blink red, in an exemplary embodiment. With each mistake, the counting must start over, but must go faster than the previous round. To increase difficulty, in some embodiments 33, 36, and 39 may require the counting player to shake their gestural device twice. As seen in image 1800, whoever correctly shouts fifty out loud wins the game.

What is claimed is:

1. A method for playing a game using a gestural gaming device comprising:

receiving, on the gestural gaming device, a first gestural input to start the game, the gestural gaming device comprising a processor, a sensor, a communications transceiver, and a plurality of lighting elements, each gestural input being received by the sensor and being sent to an application via the communications transceiver;

receiving, on the gestural gaming device, a second gestural input as part of the game being played and transmitting data corresponding to the second gestural input to the application;

activating, on the gestural gaming device, one of the lighting elements in response to receiving data from the application corresponding to a change of game state;

repeating the receiving of gestural inputs and activating lighting elements until a winner is determined according to game rules; and providing, by the gestural gaming device, a reward to a winner of the game, the reward being a previously-stored promise by an owner of the gestural gaming device to perform a task.

2. A method for providing an award in response to winning a game via a gestural gaming device, the method comprising:

receiving, on a back-end game server, a DSSO associated with a gestural gaming device, the DSSO being a previously-stored promise by an owner of the gestural gaming device to perform a task, the DSSO being associated with a location;

receiving, by the back-end game server, an indication that a game has been played on the gestural gaming device and an identifier of a winner of the game, the winner of the game having a player account on the back-end server;

transferring, by the back-end game server, the DSSO from the gestural gaming device owner player account to the player account of the winner of the game;

receiving, on the back-end game server, an indication that the owner of the gestural gaming device intends to fulfill the DSSO; and indicating, on the back-end game server, that the DSSO has been fulfilled, the indication being in response to both a) a determination that a current location of the gestural gaming device corresponds with the location associated with the DSSO, and b) receiving, by the back-end game server, an indication that a gesture input has been performed by both the gestural gaming device and another gestural gaming device possessed by the winner of the game.

* * * * *